Sept. 20, 1932.     P. C. WEGO     1,878,214
BEARING GUARD FOR CONVEYER ROLLERS
Filed Sept. 24, 1926
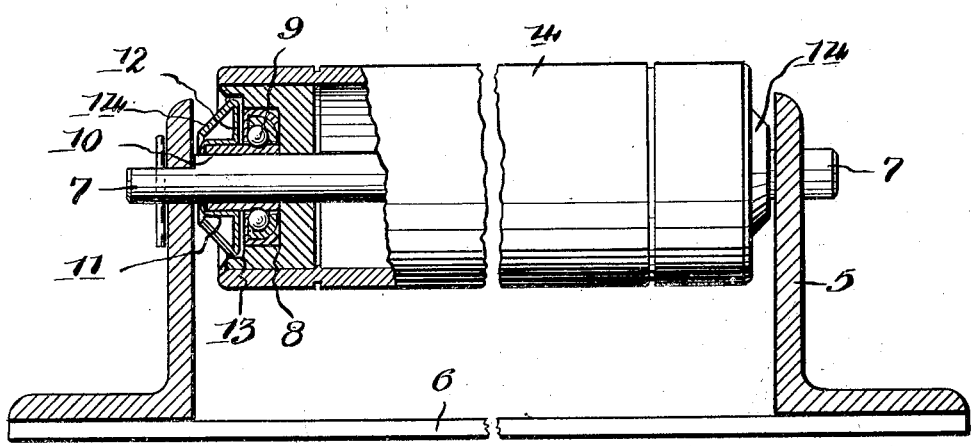
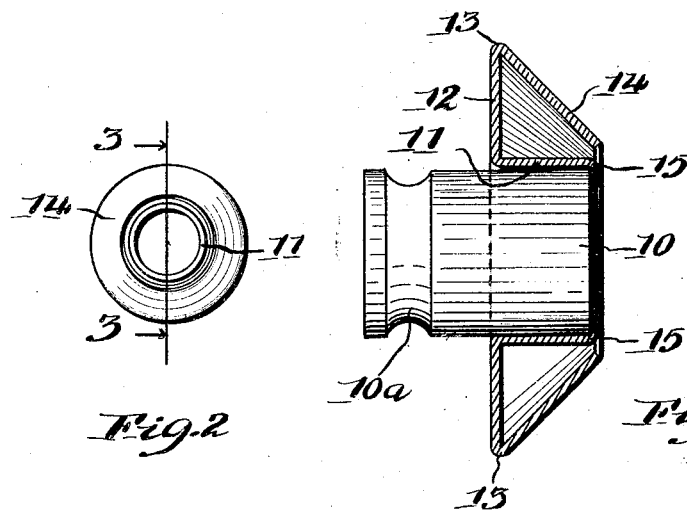
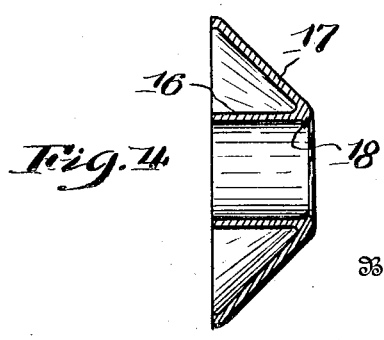
Inventor
Peter C. Wego
By Stryker & Stryker
Attorneys Patented Sept. 20, 1932

1,878,214

UNITED STATES PATENT OFFICE

PETER C. WEGO, OF ST. PAUL, MINNESOTA

BEARING GUARD FOR CONVEYER ROLLERS

Application filed September 24, 1926. Serial No. 137,498.

Conveyers of the type formed from a bed of rollers are widely used in handling goods, where grit and other injurious matter is apt to, and frequently does, reach the bearings of the rollers. Repairs and replacements of destroyed bearings are particularly troublesome where moulds for metal castings are supported upon a conveyer during the pouring operation. The molten metal is frequently spilled upon the ends of the rollers where, in the absence of an efficient guard, it reaches the bearings and causes parts thereof to fuse. Obviously, this renders the roller inoperative until repaired. Sand and other abrasives are also frequently spilled upon the ends of the rollers and special means must be provided to deflect or exclude such substances from the bearings.

It is the object of my invention to provide a novel guard, adapted to extend into a recess in the end of a roller to efficiently exclude all harmful foreign matter.

A further object is to provide a guard of this kind, which in no way interferes with the free rotation of a roller having an anti-friction or ball bearing.

This invention also includes certain other novel features of construction which will be more fully pointed out in the following specification and claim.

Referring to the drawing which illustrates one form of my invention, in Figure 1, I have shown a conveyer roller, partially in central, vertical section, and having my improved guard mounted thereon; Fig. 2 is an elevation of the guard removed from the roller; Fig. 3 is an enlarged section through the guard taken on the line 3—3 of Fig. 2 and showing the axial support in place and Fig. 4 is a central, vertical section through an alternate form of the guard, removed from its support. In the drawing, I have used the numeral 4 to indicate the cylindrical body of a conveyer roller which is revolubly supported between a pair of side rails or angle bars 5 of common type, said side rails being held in proper spaced relation by a transverse member 6. Supported at its ends in the rails 5 is a rod 7, extending axially through the roller body 4. A recess 8 in each end of the roller 4 is adapted to receive an anti-friction bearing and a sleeve 10 on the rod 7 is formed near its inner end with an annular race 10a for the balls 9 of the bearing. The outer end of the sleeve 10 is positioned adjacent to the inner surface of the rail 5.

My improved guard is preferably constructed from sheet metal formed with a cylindrical portion 11 adapted to fit snugly about the sleeve 10 and a circular base, or inner end portion 12, is bent outward from the cylindrical portion 11 and arranged to close an enlarged outer end of the recess 8. From the outer periphery 13 of the disc portion 12, the sheet metal of the guard is bent inward to form a conical deflector 14. The guard is fixed on the sleeve 10 by crimping or otherwise forming a lip 15 on the outer extremity of the portion 11, said lip 15 being adapted to prevent rotation and inward movement upon said sleeve. The guard is thus secured to the sleeve 10, so as to remain stationary thereon during the rotation of the roller.

To allow the roller 4 to freely revolve, without producing retarding friction against the stationary guard, I prefer to provide the required clearance between the inner face of the portion 12 and the revolving parts of the roller and also between the outer periphery of the guard and roller. In operation, end thrust is transmitted to the side rails by engagement of the balls 9 in the race 10a of the sleeve 10.

It will now be evident that with my guard in place on the roller, any grit, molten metal or other harmful substance which is spilled over the ends of the rollers will merely be deflected away from the bearing by the conical portion 14. There is no surface where such harmful substances can lodge adjacent to an opening to the bearing, as in rollers where the external opening between stationary and rotating parts is located adjacent to the periphery of the axial support for rollers. It will be noted that with my improved guard the external opening for clearance between stationary and rotating parts is located at the outer periphery 13 of the conical portion 14, and this opening is protected by the overhanging end of the roller.

In the alternate form of my invention, shown in Fig. 4, a cylindrical portion 16 is provided for engagement with the outer periphery of the sleeve 10 and a conical deflector 17 is adapted to extend obliquely into the recess 8 from the outer end of the portion 16. An annular lip or flange 18 near the junction of the portions 16 and 17 abuts against the end of the sleeve 10 to prevent inward sliding upon said sleeve. This alternate form of the invention is thus adapted to be fixed upon an axial support for the roller in a manner similar to the form shown in Figs. 1 to 3.

In both embodiments illustrated, the axial support for the roller consists of the sleeve 10 and rod 7 extending axially through the body 4. However, it will be understood that the invention is not limited to such a roller and other forms of supports may be provided without departing from the spirit of my invention. Thus, my improved guard may be supported upon a short stud or pintle, of the type in present wide use, which is held in the side rail and terminates in the adjacent end recess for the bearing.

Having described my invention what I claim as new and desire to protect by Letters Patent is:

A conveyer roller having in combination, side rails, a rod supported on said rails, a roller body mounted on said rod, said body having an end recess for a bearing, a sleeve slidably fitting said rod in said recess, the outer end of said sleeve projecting to transmit end thrust to one of said rails, a bearing for said body on the inner end of said sleeve in one of said recesses, said sleeve having an annular depression and said bearing having elements to engage said sleeve in said depression to prevent longitudinal movement of said body relative to said sleeve, a guard having a collar portion fitting snugly on said sleeve and an annular rim portion projecting in spaced relation to said body and forming therewith an external, annular opening into said recess, said opening being protected from the entry of foreign matter by an overhanging end on said body and an integral, offset projecting from said collar portion and engaging said sleeve to positively retain said guard against movement toward said roller body.

In testimony whereof, I have hereunto signed my name to this specification.

PETER C. WEGO.